Feb. 27, 1968 W. G. GELUSHIA ET AL 3,371,278
ELECTRONIC WARNING SYSTEM FOR VEHICLES
Filed Sept. 9, 1966 2 Sheets-Sheet 1

INVENTORS
Warren G. Gelushia,
Gilbert A. Ilbery &
Dalton L. Smith
BY John A. Mawhinney
ATTORNEY

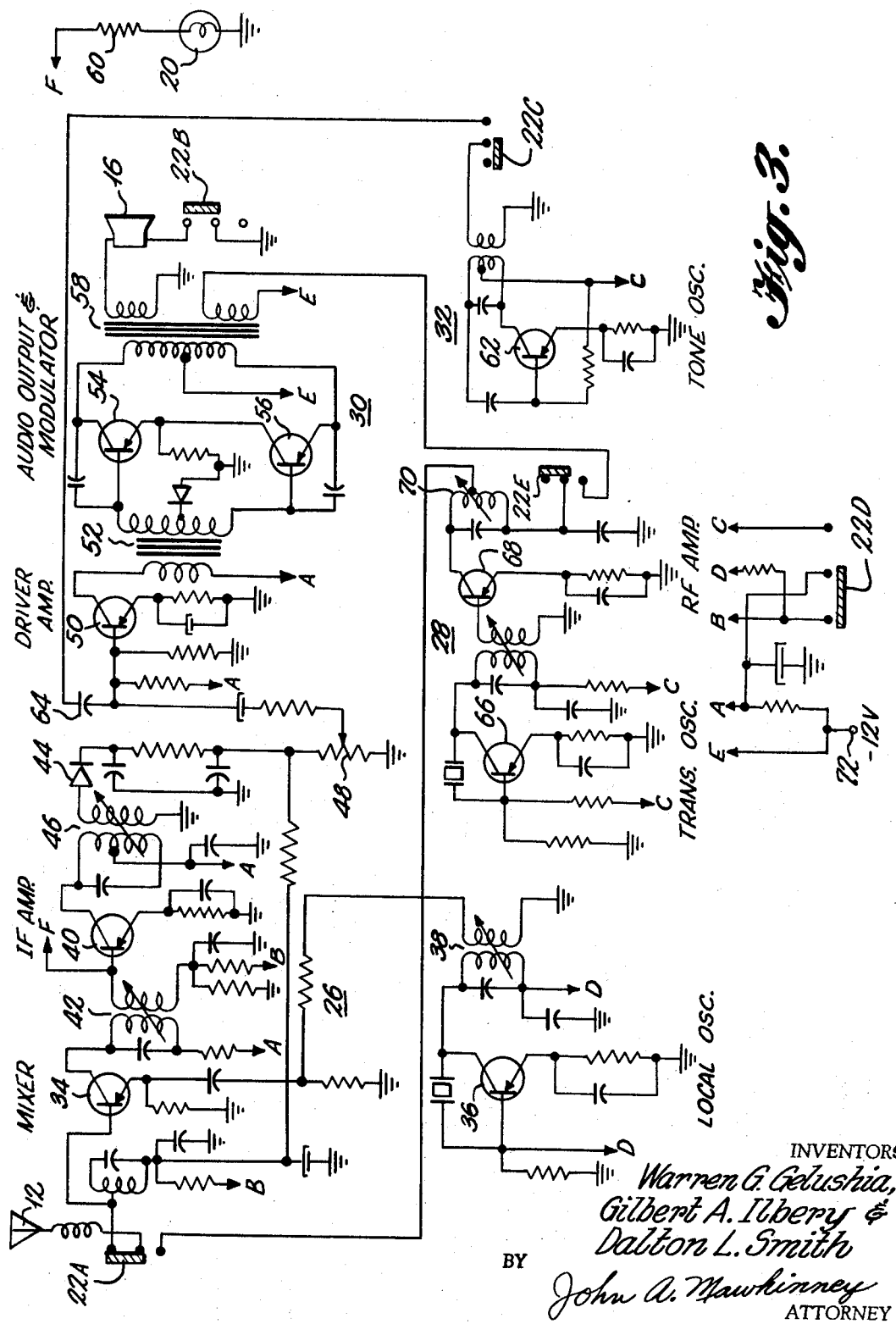

3,371,278
ELECTRONIC WARNING SYSTEM FOR VEHICLES
Warren G. Gelushia, Marlin, Tex. (113 N. Emberwood, Robinson, Tex. 76706); Gilbert A. Ilbery, 3300 Lyle St., Waco, Tex. 76708; and Dalton L. Smith, 310 Live Oak St., Marlin, Tex. 76661
Filed Sept. 9, 1966, Ser. No. 578,308
6 Claims. (Cl. 325—64)

ABSTRACT OF THE DISCLOSURE

An electronic warning system for vehicles wherein each vehicle is equipped with a transceiver apparatus whereby the operators of said vehicles can both warn and be warned by other vehicles of approaching or ensuing danger.

---

This invention relates generally to vehicular warning systems and more particularly to an improved electronic warning system for forewarning a vehicle operator of an impending danger due to the hazardous proximity of another vehicle.

Present-day vehicle warning devices are almost limited exclusively to signs and lights. There are systems, however, which provide for a radio transmitter to be located at a fixed site of hazardous or restricted operation for radiating a warning signal in all directions and a radio receiver, moreover, is installed in each moving vehicle which is responsive to the radiated signal from the transmitter so as to energize an operator alarm within the vehicle when it has entered the radiation field of the transmitter, thereby alerting the operator of a hazardous condition at that site.

It is an object of the present invention, however, to provide an improved vehicle operator warning system which will alert the operator of impending danger from the proximity of another vehicle.

It is yet another object of the present invention to provide an electronic warning safety system for vehicles which adequately warns the operators of these vehicles of approaching or ensuing danger in sufficient time to take preventive measures to avoid a possible collision or other catastrophe.

It is yet another object of the present invention to provide an improved system for alerting the operators of vehicles of an impending hazardous driving condition which will override surrounding noises and distractions.

Briefly, the subject invention contemplates incorporating the subject invention in each vehicle, e.g., such as auto, bus, train, airplane or ship or any other conveyance that would come in contact with another vehicle in a similar mode of travel. The invention comprises a combined transmitter-receiver apparatus (transceiver) which is adapted to operate normally in a receive mode of operation such that upon the reception of a signal of predetermined frequency an audio and visual alarm will be provided. A momentary actuated switch is coupled to the apparatus for momentarily rendering the receiver portion inoperative while rendering the transmitter portion operative to transmit a signal of said predetermined frequency so that the receiver portion of another vehicle will respond thereto. The transmitter portion includes an audio tone oscillator which is used to modulate the carrier frequency of the transmitter portion when energized. This tone frequency is demodulated by the receiver portion of another vehicle and provides an audio signal which is coupled to a transducer such as a loudspeaker for providing an alarm signal to the operator. The operator in each vehicle, then, will momentarily actuate the switch when he senses an impending danger due to the proximity of another vehicle at which time his normally operative receiver portion will be de-energized and an alarm signal will be transmitted from the transmitter portion to the receiver portion of the other vehicle.

Other objects and advantages of the present invention will become apparent as the following detailed description is read in connection with the following drawings, in which:

FIGURE 3 is a schematic diagram of what is considered at present to be the preferred embodiment of the subject invention.

Figure 1:
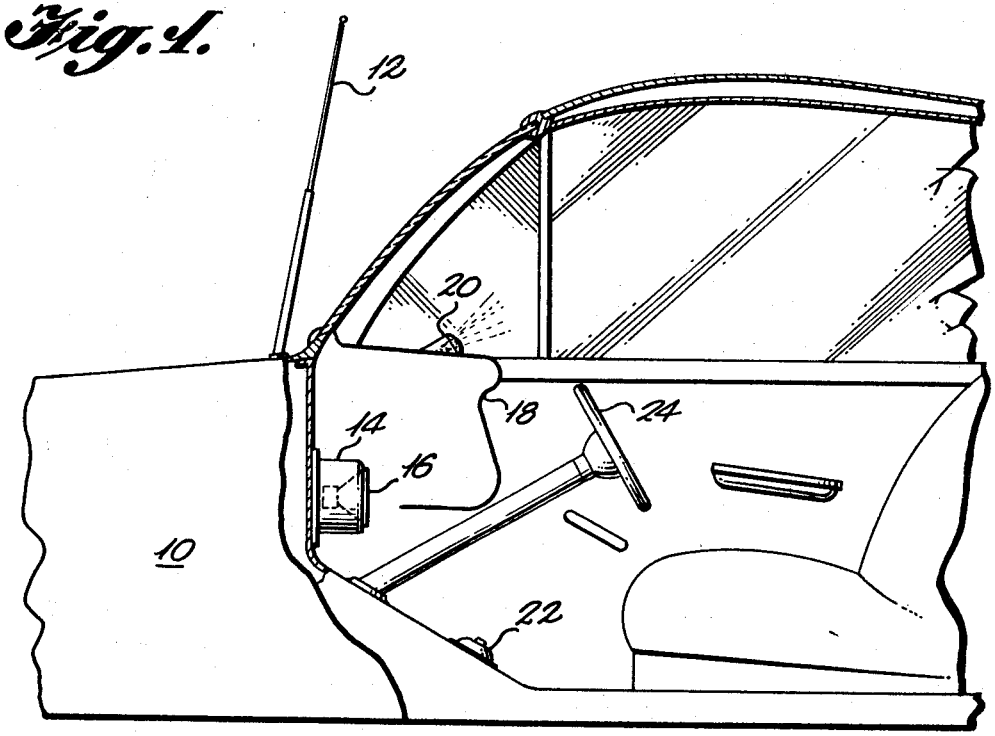
FIGURE 1 is a cut-away view of a vehicle, such as an automobile, including the subject invention incorporated therein.

Referring now to the drawings, reference numeral 10 generally illustrates a vehicle, such as an automobile, having an antenna 12 which is typical of the type presently in use for commercial broadcast receivers utilized in automobiles. Reference numeral 14 generally discloses the housing which is adapted to include the electronic circuitry embodying the subject invention as well as an audio transducer such as a loudspeaker 16. The housing unit 14 is shown being located beneath the dashboard 18 on the fire wall. A visual indicator such as a blinking lamp 20 is located on the top portion of the dashboard 18 so as to be in view of the operator, not shown. A foot-depressed momentary actuation switch 22 is shown located on the floorboard of the vehicle such that it is within easy reach of the operator.

This configuration is shown by way of example only and is not meant to be considered in a limiting sense since it is possible that it might be desirable to incorporate the switch 22 in the horn actuator switch contained in the steering column at the hub of the steering wheel 24. It might also be desirable to mount the visual indicator 20 in the roof portion or other location of the vehicle.

Figure 2:
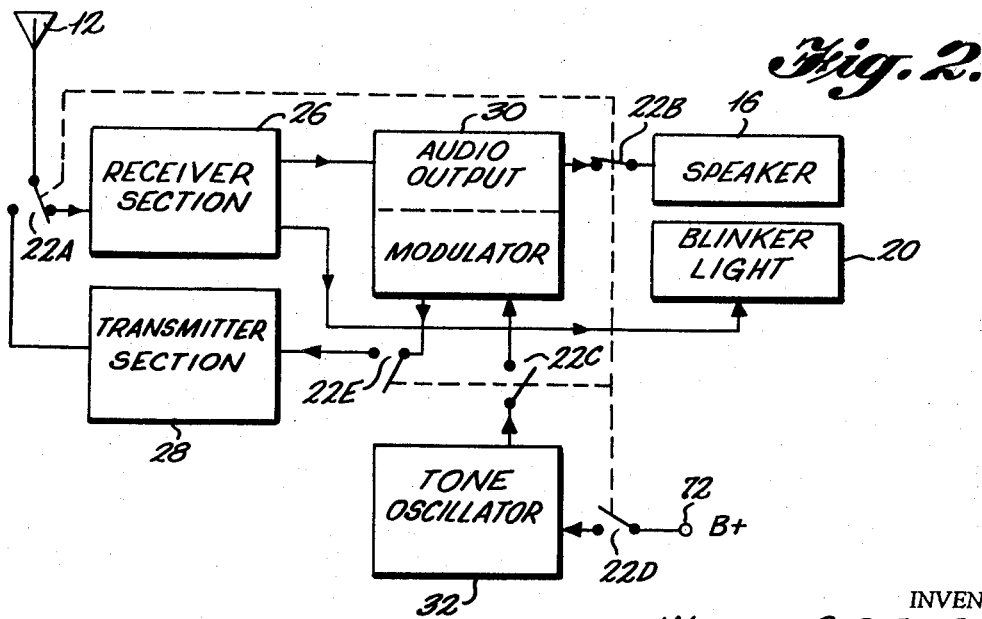
FIGURE 2 is an electrical diagram in block diagrammatic form illustrative of the preferred embodiment of the subject invention.

Directing attention now to FIGURE 2 which is a block diagram of the subject invention, reference numeral 12 schematically represents the antenna shown in FIGURE 1 and is coupled to a receiver section 26 and a transmitter section 28 by means of switch section 22A which is one switch element of a multi-ganged two position momentary actuated switch 22. The switch 22 is adapted to have a first and a second operating state corresponding to a steady state and a momentary state, respectively. The switch 22A will be illustrated in its first or steady state position. FIGURE 2 therefore illustrates switch section 22A coupling antenna 12 to the receiver section 26 by means of the normally closed contacts thereof while the normally open contacts are coupled to the transmitter section 28. The receiver section 26 is coupled to an audio output and modulator section 30 which is then connected to a speaker 16 by means of switch section 22B. A blinker light 20 is also adapted to be coupled back to the receiver section 26. The audio output and modulator section 30 will be described in detail subsequently; however, it should be pointed out that it is contemplated that it is intended to operate as an audio output amplifier in the receive mode but as a modulator circuit in the transmit mode.

A tone oscillator 32 comprising an audio oscillator is coupled to the audio output and modulator circuit 30 by means of the normally open switch contact section 22C. Another normally open switch contact section 22D is also adapted to couple a supply voltage from a source, not shown, to the tone oscillator 32. Finally, the transmitter section 28 is shown coupled to the audio output and modulator circuit 30.

Briefly, switch 22 operates to render the receiver portion normally operative such that when a signal is received from another vehicle by means of the antenna 12, the receiver section which normally includes a local oscillator, mixer, and IF amplifier, acts to demodulate the received signal which is then fed to the audio output circuit 30 and to the loudspeaker 16 by means of the normally closed switch contacts 22B. The blinker light 20 is adapted to be actuated by the receiver section 26 upon reception of a signal at the antenna 12.

When the operator senses an impending danger from other vehicles in the proximity, the switch 22 is depressed momentarily coupling the antenna 12 to the transmitter section 28. The speaker 16 is uncoupled from the audio output and modulator circuit 30 while the tone oscillator 32 is coupled thereto by means of switch contacts 22C. The tone oscillator meanwhile has been energized by the closure of switch contact section 22D. Also, the audio output and modulator circuit is coupled back to the transmitter section 28 by means of switch section 22E. The tone oscillator 32 then feeds an audio frequency signal to the audio output and modulator circuit 30 which is used to modulate the carrier frequency of the output signal from the transmitter section 28 which is then radiated to other vehicles by means of the antenna 12.

The system contemplated, then, is a combined transmitter-receiver system which is normally operated in the receive mode so as to be responsive to warning signals from other vehicles. In the event, however, that the operator is aware of an impending danger, he merely depresses a switch 22 which de-activates his receiver while simultaneously activating his own transmitter, which in turn transmits warning signals to the other vehicles.

FIGURE 3 schematically illustrates one embodiment of the subject invention. The antenna 12 is coupled to a mixer circuit including transistor 34 by means of switch section 22A. A crystal-controlled local oscillator including transistor 36 is coupled to the emitter circuit of transistor 34 by means of transformer 38. The action of the mixer and local oscillator produces an IF signal which is coupled to an IF amplifier including transistor 40 by means of transformer 42. The amplified IF signal is coupled to diode 44 by means of transformer 46. Diode 44 acts as a detector to provide an AF frequency across the potentiometer 48. The circuitry including the mixer, local oscillator, IF amplifier and diode detector comprises the receiver section 26 illustrated in FIGURE 2. The audio frequency signal is coupled to a driver amplifier including transistor 50. The output of the driver amplifier is coupled to the audio output and modulator circuit comprising transformer 52, the push-pull amplifier including transistors 54 and 56 and the output transformer 58. One secondary winding of the output transformer 58 is coupled to one side of the loudspeaker 16 which has the other side thereof connected to switch contact section 22B. A visual alarm comprising a blinking light 20 is coupled back to the base of transistor 40 by means of resistor 60.

A tone oscillator circuit 32 including transistor 62 is coupled back to the input of the driver amplifier including transistor 50 by means of switch section 22C and capacitor 64.

The transmitter section 28 is comprised of a crystal-controlled oscillator including transistor 66 which is coupled to an RF amplifier including transistor 68. The other secondary winding of the output transformer 58 is coupled to the collector circuit of transistor 68 by means of switch section 22E. The output of the RF amplifier is adapted to be coupled to the antenna 12 by means of switch section 22A connected to the coil winding 70.

The switch 22 comprised of sections 22A–22E are shown in a first state of operation which has been defined as the steady state position indicative of the receive mode of operation of the subject invention.

Additionally, FIGURE 3 includes a terminal 72 which is adapted to be connected to a source of power supply voltage (−12 v.). The power supply voltage applied to terminal 72 is adapted to be applied to voltage points A, B, C, D and E in a selected manner in accordance with the position of switch section 22D; however, it should be noted that the voltage at points A and E are constantly applied.

In operation, the transmitter section 28 and the tone oscillator 32 are inoperative when the switch 22 (sections A–E) are in the receive position as shown whereas the receiver section 26, the driver amplifier 50 and the audio output amplifier including transistors 54 and 56 are operative to act as a receiver of an alarm signal which produces an audio alarm at the speaker 16. When the switch 22 is momentarily actuated, the mixer local oscillator and IF amplifier are rendered inoperative and a power supply voltage is coupled to the tone oscillator 32 and transmitter oscillator 28. The output of the tone oscillator is now coupled to the driver amplifier 50 and the push-pull amplifier including transistors 54 and 56 and injected into the collector circuit of transistor 68 by means of a secondary winding of the output transformer 58. The carrier frequency of the transmitter oscillator is modulated by the signal from the tone oscillator and is coupled to the antenna 12 through switch section 22A.

The frequencies of the transmitter oscillator and the local oscillator are so selected that the receiver portion of all the other vehicles are responsive to the carrier frequency of the transmitter portion of any other vehicle. Moreover, the oscillators are crystal-controlled for stability. The frequency of the tone oscillator is adapted to operate in the audio range such that when it is received by a receiver and translated to its respective loudspeaker, a tone will be heard which will override any background noise present in the vehicle.

What has been shown and described, therefore, is a transceiver installed in each auto or other vehicle that both transmits and receives signals which are indicative of impending danger.

While there has been shown and described what is considered at present to be the preferred embodiment of the invention, modifications thereto will readily occur to those skilled in the art. For example, the component values selected will be governed by the frequency allocated by the Federal Communications Commission (FCC). It is not desired, therefore, that the invention be limited to those specific arrangements shown and described. It is to be understood that all equivalents, alterations and modifications within the spirit and scope of the invention herein are meant to be included.

We claim as our invention:

1. An electronic warning system for vehicles whereby the operators of said vehicles can both warn and be warned by other vehicles of approaching or ensuing danger, comprising in combination:

antenna apparatus mounted on a vehicle and adapted to operate both as a transmitting and a receiving antenna;

radio transceiver apparatus, including a receiver section and a transmitter section, mounted on said vehicle and coupled to said antenna apparatus, being operable to selectively act as either a receiver or a transmitter of radio signals, both sections being selectively tuned to substantially the same frequency such that said receiver section of one vehicle is responsive to signals from said transmitter section of another vehicle;

switch means, having a first or normally steady state and a second or intermittent state of operation, coupled to said radio transceiver apparatus and being adapted to be operated by said operator of said vehicle causing said radio transceiver apparatus to operate as a receiver when said switch means is in said normally steady state of operation and as a transmitter when said switch means is in said intermittent state of operation;

an audio output and modulator transformer, having a primary winding and a pair of secondary windings;

circuit means coupling said primary winding to said receiver section;

a tone signal oscillator being normally inoperative when said switch means is in said normally steady state but becoming operative when said switch means is in said intermittent state;

circuit means coupling said tone signal oscillator to said primary winding of said audio output and modulator transformer through said switch means when said means is in said intermittent state;

circuit means coupling one of said pair of secondary windings to said transmitter section through said switch means when said switch means is in said intermittent state;

and transducer means coupled to the other secondary winding of said pair of secondary windings being operated only when said switch means is in said normally steady state for communicating said tone signal to the operator of said one vehicle.

2. The invention as defined in claim 1 wherein said signal oscillator comprises an audio oscillator operating at a predetermined frequency, and wherein said transducer means comprises a loudspeaker responsive to said predetermined frequency of said audio oscillator.

3. The invention as defined in claim 1 and additionally including a visual indicator coupled to said receiver section and being responsive to received signals for providing a visual warning of impending danger.

4. The invention as defined in claim 1 wherein said receiver section and said transmitter section each include crystal-controlled oscillators for maintaining both said sections at a predetermined tuned frequency of operation.

5. The invention as defined in claim 1 wherein said switch means includes means for coupling said antenna apparatus to said receiver section when in said first state of operation and to said transmitter section when in said second state of operation.

6. The invention as defined in claim 1 wherein said switch means comprises a foot-operated momentary depressed switch selectively located on said vehicle.

References Cited

UNITED STATES PATENTS

| | | | |
|---|---|---|---|
| 2,459,105 | 1/1949 | Halstead | 343—178 |
| 2,671,166 | 7/1950 | O'Brien | 325—64 |

ROBERT L. GRIFFIN, *Primary Examiner.*

JOHN W. CALDWELL, *Examiner.*

A. J. MAYER, *Assistant Examiner.*